(12) United States Patent
Bhogal et al.

(10) Patent No.: US 8,566,728 B2
(45) Date of Patent: Oct. 22, 2013

(54) CALENDAR ENTRY DISPLAY METHOD

(75) Inventors: Kulvir S. Bhogal, Fort Worth, TX (US); Travis M. Grigsby, Austin, TX (US); Robert R. Peterson, Austin, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/968,723

(22) Filed: Jan. 3, 2008

(65) Prior Publication Data
US 2009/0177984 A1    Jul. 9, 2009

(51) Int. Cl.
G06F 3/048    (2013.01)

(52) U.S. Cl.
USPC ........... 715/751; 715/752; 715/753; 715/754; 715/755; 715/756; 715/757; 715/758; 715/733; 715/963

(58) Field of Classification Search
USPC ................. 715/751–758, 733, 963
See application file for complete search history.

(56) References Cited

U.S. PATENT DOCUMENTS

| | | | |
|---|---|---|---|
| 5,819,263 A * | 10/1998 | Bromley et al. .................. 1/1 |
| 6,925,603 B1 | 8/2005 | Naito et al. |
| 7,027,995 B2 | 4/2006 | Kaufman et al. |
| 7,096,232 B2 | 8/2006 | Doss et al. |
| 7,139,722 B2 * | 11/2006 | Perrella et al. ............... 705/7.19 |
| 7,233,933 B2 * | 6/2007 | Horvitz et al. .................. 706/21 |
| 7,328,029 B1 * | 2/2008 | Adamczyk et al. .......... 455/456.3 |
| 2002/0131565 A1 * | 9/2002 | Scheuring et al. .......... 379/88.19 |
| 2004/0122721 A1 * | 6/2004 | Lasorsa .............................. 705/8 |
| 2005/0119927 A1 * | 6/2005 | Patel ................................. 705/8 |
| 2006/0005133 A1 * | 1/2006 | Lyle et al. ...................... 715/708 |
| 2006/0224969 A1 * | 10/2006 | Marston ......................... 715/753 |
| 2007/0118415 A1 * | 5/2007 | Chen et al. ........................ 705/8 |
| 2007/0167136 A1 * | 7/2007 | Groth .......................... 455/41.2 |
| 2007/0256035 A1 * | 11/2007 | Matsuzawa et al. .......... 715/864 |
| 2007/0264969 A1 * | 11/2007 | Frank et al. ................ 455/404.2 |

OTHER PUBLICATIONS

CAM920060101.txt, Internal Company Document, "Meeting Resource Scheduling Based Upon Attendee Participation Types", Aug. 9, 2007.
7902770.txt, Internal Company Document, "Freetime Search with Multiple Forms of Availability", Apr. 2002.
The Integration of Location-Based Information From a GPS Receiver With Presence Information in a Quick-Messaging Application, Nov. 21, 2005, IP.com.

* cited by examiner

*Primary Examiner* — Omar Abdul-Ali
*Assistant Examiner* — Anil Bhargava
(74) *Attorney, Agent, or Firm* — Cantor Colburn LLP; Elissa Wang

(57) ABSTRACT

A method of displaying a calendar entry of an electronic calendar application is disclosed. The method includes determining if a user of the electronic calendar application is within a specified distance of a location of an appointment corresponding to the calendar entry at a specified time prior to the appointment. In response to determining that the user is within the specified distance at the specified time, displaying an indication with the calendar entry that the appointment is face-to-faceable. In response to determining that the user is not within the specified distance at the specified time, displaying an indication with the calendar entry that the appointment is not face-to-faceable.

4 Claims, 3 Drawing Sheets

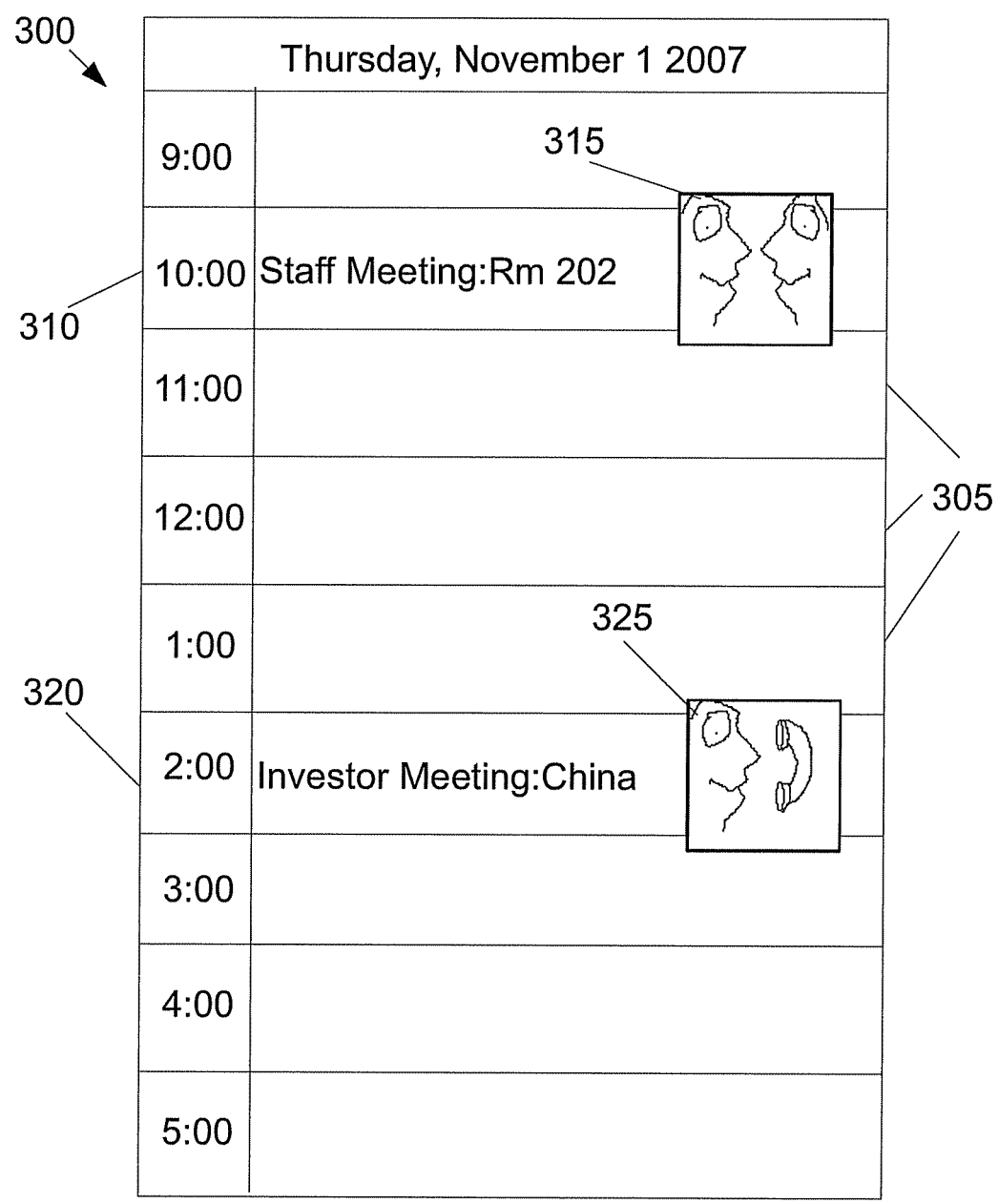

CALENDAR ENTRY DISPLAY METHOD

BACKGROUND OF THE INVENTION

1. Field of the Invention

This invention relates to electronic calendar applications, and particularly to electronic calendar application user interfaces.

2. Description of Background

Personal information management systems include electronic calendar and scheduling applications for users to maintain appointment or event entries within the electronic calendar. Electronic calendar applications can include location awareness capabilities of the user and provide a variety of possibilities for efficient information management. Current calendar applications including location awareness capabilities require a user to compare his current location with an appointment location to determine whether it is possible to attend the appointment in person or if it will be necessary to attend the appointment via remote access, such as a telephone or web camera for example. Accordingly, there is a need in the art for an electronic calendar arrangement that overcomes these drawbacks.

SUMMARY OF THE INVENTION

An embodiment of the invention includes a method of displaying a calendar entry of an electronic calendar application. The method includes determining if a user of the electronic calendar application is within a specified distance of a location of an appointment corresponding to the calendar entry at a specified time prior to the appointment. In response to determining that the user is within the specified distance at the specified time, the method includes displaying an indication with the calendar entry that the appointment is face-to-faceable. In response to determining that the user is not within the specified distance at the specified time, the method includes displaying an indication with the calendar entry that the appointment is not face-to-faceable.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides an electronic calendar application user interface to display upon a display device whether a user is capable to attend an appointment in person or if it will be necessary to attend the appointment via remote access.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts an embodiment of a user interface of an electronic calendar application in accordance with an embodiment of the invention.

The detailed description explains the preferred embodiments of the invention, together with advantages and features, by way of example with reference to the drawings.

DETAILED DESCRIPTION OF THE INVENTION

An embodiment of the invention provides a user interface for an electronic calendar application that displays to a user whether the user will be able to attend a meeting in person, or face to face, based upon at least one of a current location and a planned location of the user. As used herein, the term "F2F-able" shall define a meeting or calendar appointment entry that the user can attend face to face, in person, if they so choose. Alternatively, a meeting or calendar appointment entry that the user is not able to attend face to face, in person, shall be referred to as "non-F2F-able".

Figure 1:
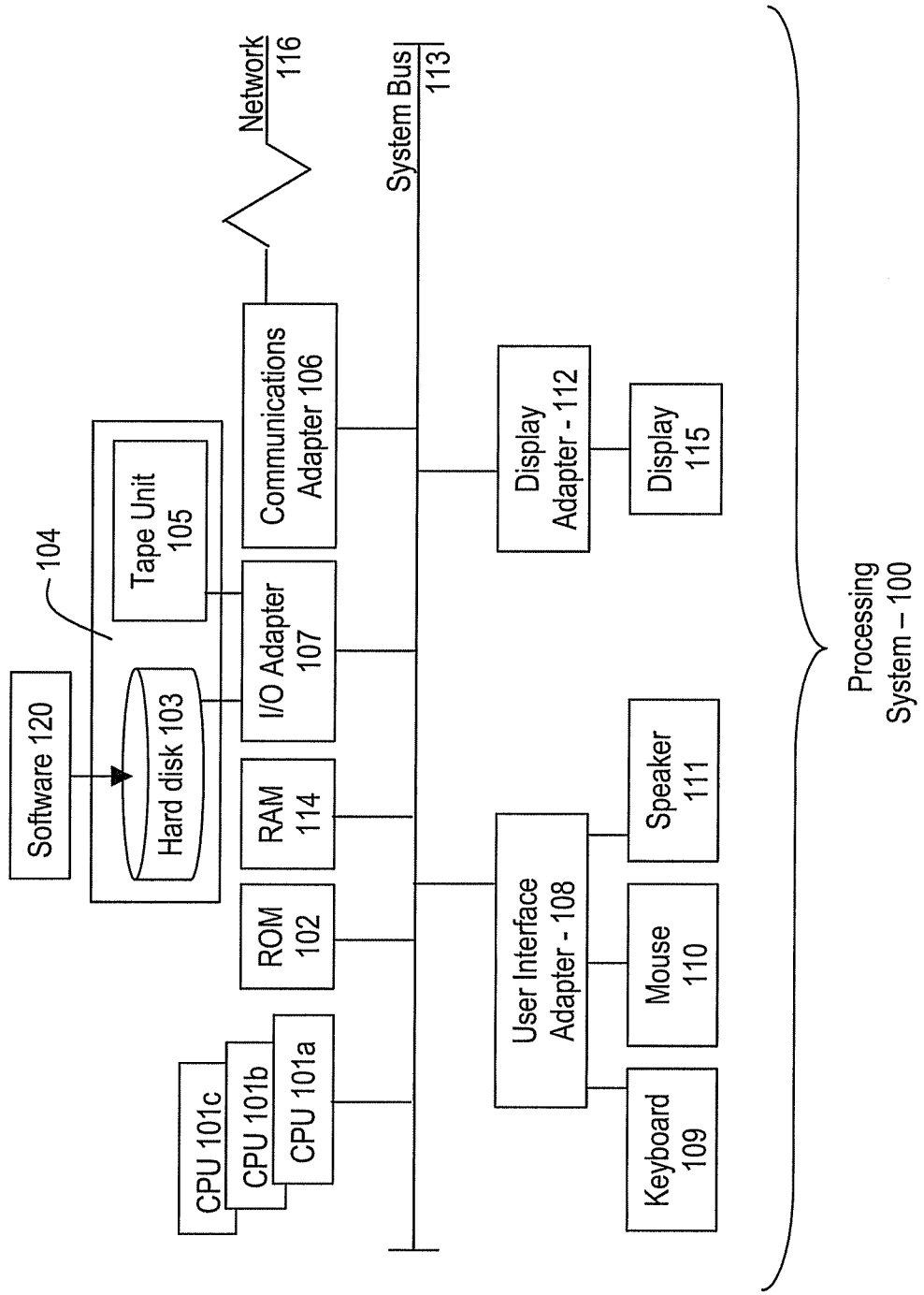
FIG. 1 depicts a block schematic diagram of a processing system in accordance with an embodiment of the invention.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes the network adapter or interface 106 for communicating over the network 116. The network 116 can be a local-area network (LAN), a metro-area network (MAN), or wide-area network (WAN), such as the Internet or World Wide Web.

Users of the system 100 can connect to the network 116 through any suitable network interface 106 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable instructions stored on machine readable media (for example, the hard disk 103) for capture and interactive display of information shown on the screen 115 of a user. As discussed herein, the instructions are referred to as "software" 120. The software 120 may be produced using software development tools as are known in the art. Also discussed herein, the software 120 may also referred to as an "electronic calendar application" 120 or other similar terms. The software 120 may include various tools and features for providing user interaction capabilities as are known in the art.

Figure 2:
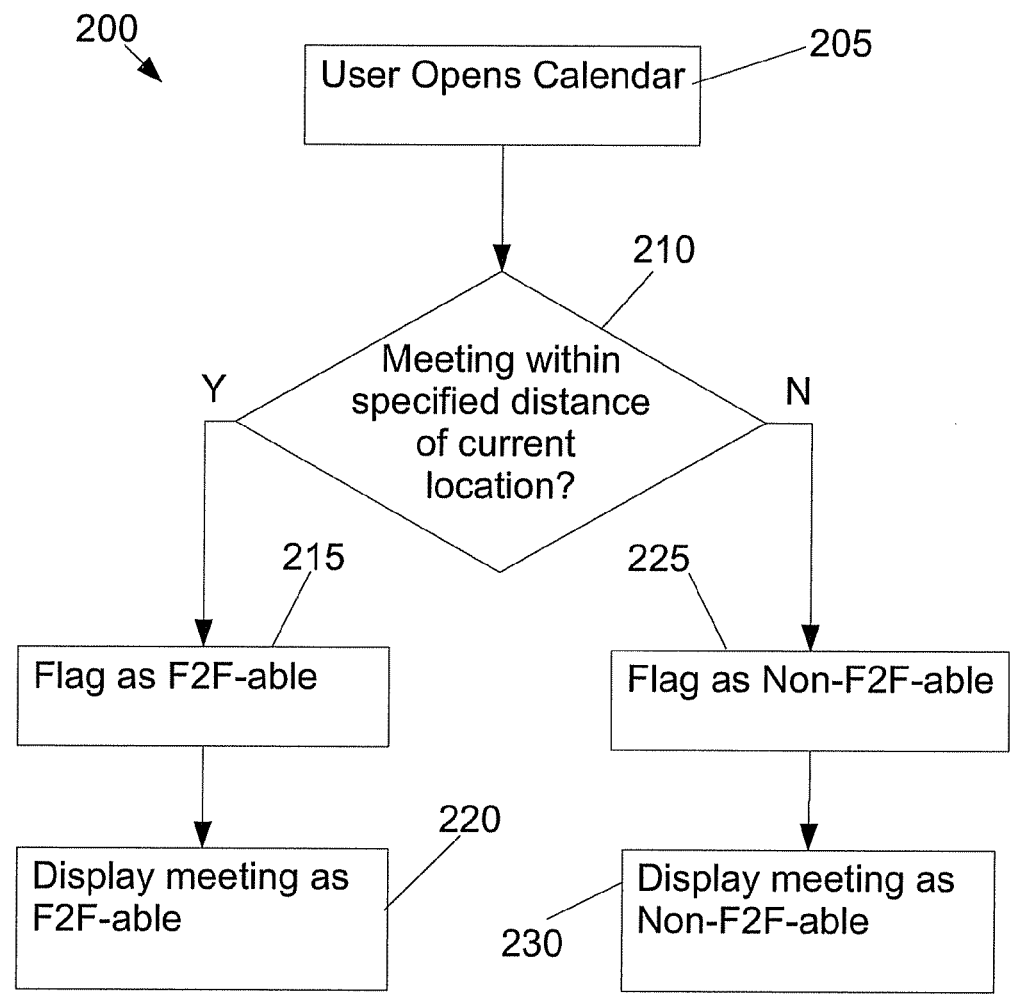
FIG. 2 depicts a flowchart of process steps for displaying whether an appointment is face-to-faceable in accordance with an embodiment of the invention.

FIG. 2 depicts a flowchart 200 of process steps of a method of displaying to a user whether they will be able to attend a scheduled meeting or calendar appointment in person, that is, whether the meeting is F2F-able.

The method begins at block 205 with the user opening a user interface 300 (FIG. 3) or calendar within the electronic calendar application 120. The method proceeds to decision block 210, which determines whether the meeting, scheduled to begin within a specified amount of time, is within a specified distance of the user's current location. Decision block 210 thereby determines if it will be possible, based on the starting time and location of the meeting and the present location of the user, for the user to attend the meeting in person. For example, if the meeting is scheduled to begin within 10 minutes, and the user is located more than 5 miles from the meeting location, it is very likely that it is not possible for the user to attend the meeting in person. As an alternative example, if the meeting is scheduled to begin within 30 minutes, and the user is located less than one-half mile from the meeting location, it is likely that it is possible for the user to attend the meeting in person.

Accordingly, if it is determined at decision block 210 that the meeting, scheduled to begin within a specified amount of time is within a specified distance of the current location of the user, the method proceeds to block 215, and flags the meeting as F2F-able. The method then proceeds to block 220, and displays, upon display 115 for example, the calendar appointment including a graphical indication that the meeting is F2F-able.

Alternatively, if it is determined at decision block 210 that the meeting, scheduled to begin within a specified amount of time is not within a specified distance of the current location of the user, the method proceeds to block 225, and flags the meeting as Non-F2F-able. The method then proceeds to block 230, and displays, upon display 115 for example, the calendar appointment including a graphical indication that the meeting is Non-F2F-able.

In an embodiment, if a difference between a present time and a time of the appointment corresponding to the calendar entry is less than a threshold value, such as for each calendar entry corresponding to a current day for example, software 120 determines whether an actual location of the user is within a specified distance of the meeting location at a specified time prior to the planned meeting time. For example, for each calendar entry corresponding to the same day, if the user is actually located within one quarter mile or less of the meeting location within one-half hour prior to the meeting start time, it is determined at decision block 210 that the meeting is F2F-able, and displayed as such in block 220.

If a difference between a present time and a time of the appointment corresponding to the calendar entry is greater than a threshold value, such as for each calendar entry that is not on the current day for example, software 120 determines whether a planned location for the user is within the specified distance of the calendar entry meeting location at a specified time prior to the planned meeting time. For example, for each calendar entry corresponding to a future day, if the user is planned to be within one quarter mile or less of the meeting location with one-half hour prior to the meeting start time, it is determined at decision block that the meeting is F2F-able, and displayed as such in block 220.

While an embodiment has been described wherein determination of a F2F-able meeting is based upon the user being within one quarter mile or less of the meeting location within one-half hour prior to the meeting start time, it will be appreciated that the scope of the invention is not so limited, and is contemplated to include other embodiments in which the actual specified distance range and time period may be adjusted by the user accordingly.

In an embodiment, the software 120 provides directions from at least one of the current and the planned location of the user to the meeting location for meetings that are determined to be F2F-able.

FIG. 3 depicts an embodiment of the user interface 300 of the electronic calendar application, such as a calendar day view for example. The calendar day view 300 includes one or more calendar entries 305. As used herein, reference numeral 305 shall refer generally to calendar entries within the user interface 300.

As an example, calendar entry 310 of the day view 300 corresponds to an appointment described as "Staff Meeting" that is scheduled to take place at 10:00, and be located within Room 202. In response to determination by decision block 210 (see FIG. 2) that the appointment is within the specified distance of the user at the specified time prior to the meeting, block 220 displays within the day view 300 an indication 315, such as an icon for example, that the meeting is F2F-able. In one embodiment, the icon 315 includes a graphical representation of two faces, thereby indicating that the meeting represented by calendar entry 310 is F2F-able.

As another example, calendar entry 320 of the day view 300 corresponds to an appointment described as "Investor Meeting" that is scheduled to take place at 2:00, and be located in China. In response to determination by decision block 210 (see FIG. 2) that the meeting is outside of the specified distance of the user at the specified time prior to the meeting, block 230 displays within the day view 300 an indication 325, such as an icon for example, that the meeting is non-F2F-able. In one embodiment, the icon 325 includes a graphical representation of a face and a telephone, thereby indicating that the meeting represented by calendar entry 320 is non-F2F-able, and will require remote access, such as via telephone or web camera, for example.

In another embodiment, the indications 315, 325 include audible indications to the user. For example, the indication 315 may include an icon to activate an audible message such as "This meeting is face to face and 3 miles away. Please plan to leave your current location at least 10 minutes before the meeting". Further, the software 120 may access a database within which alternate graphical icons are stored for use as the indications 315, 325. For example, if Suzy and Bill have a face-to-faceable meeting, a picture of Bill and Suzy is displayed. As another example, if the meeting includes Bill and his department a picture of Bill would be displayed next to a group of individuals indicating that it was a large team meeting. As another example, if Suzy wanted more information of who Bill was she could click on his photo to open up a company directory.

In view of the foregoing, the software 120 facilitates a method of displaying a calendar entry 305 within the user interface 300 of the electronic calendar application 120. The method includes determining if a user of the electronic calendar application 120 is within a specified distance of a location of an appointment that corresponds to the calendar entry, such as calendar entries 310 and 320 for example, at a specified time prior to the appointment.

In response to determining that the user is within the specified distance at the specified time, the method includes displaying the indication 315 with the calendar entry 310 that the appointment is face-to-faceable. Alternatively, in response to determining that the user is not within the specified distance at the specified time, the method includes displaying the indication 325 with the calendar entry 320 that the appointment is not face-to-faceable.

In one embodiment, in response to a difference between a present time and a time of the appointment corresponding to the calendar entry 305 being greater than a threshold value (such as the appointment being scheduled within the distant future or a different day, for example), determining whether the user is within the specified distance is based upon data of a planned location the user, such as may be indicated or stored within the electronic calendar application 120, for example. Alternatively, in response to a difference between a present time and a time of the appointment corresponding to the calendar entry 305 being less than a threshold value (such as the appointment being scheduled within the near future or same day, for example), determining whether the user is within the specified distance is based upon data of an actual location the user, such as may be indicated via location aware capabilities of the electronic calendar application 120.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of displaying a calendar entry of an electronic calendar application, the method comprising:
   determining an actual location of a user of the electronic calendar application;
   automatically determining if the actual location of the user of the electronic calendar application is within a specified distance of a location of an appointment corresponding to the calendar entry at a specified time prior to the appointment;
   in response to determining that the user is within the specified distance at the specified time, displaying a first graphical icon with the calendar entry that indicates that the appointment is face-to-faceable; and
   in response to determining that the user is not within the specified distance at the specified time, displaying a second graphical icon, different than the first graphical icon, with the calendar entry that indicates that the appointment is not face-to-faceable and that the user may attend the appointment and will require remote access to the meeting.

2. The method of claim 1, wherein:
   in response to a difference between a present time and a time of the appointment being greater than a threshold value, the determining is based upon data of a planned location of the user.

3. The method of claim 1, wherein:
   in response to a difference between a present time and a time of the appointment being less than a threshold value, the determining is based upon data of an actual location of the user.

4. The method of claim 1, wherein the indication that the appointment is face-to-faceable comprises a graphical icon comprising two faces.

* * * * *